United States Patent
Zhu

(10) Patent No.: US 10,394,755 B2
(45) Date of Patent: Aug. 27, 2019

(54) INFORMATION PRESENTATION METHOD AND APPARATUS

(71) Applicant: ALIBABA GROUP HOLDING LIMITED, Grand Cayman (KY)

(72) Inventor: Yanyan Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/626,956

(22) Filed: Jun. 19, 2017

(65) Prior Publication Data

US 2017/0300478 A1    Oct. 19, 2017

Related U.S. Application Data

(63) Continuation of application No. PCT/CN2015/098249, filed on Dec. 22, 2015.

(30) Foreign Application Priority Data

Dec. 29, 2014   (CN) .......................... 2014 1 0838339

(51) Int. Cl.
    *G06F 16/00*   (2019.01)
    *G06Q 10/10*   (2012.01)

(52) U.S. Cl.
    CPC ............. *G06F 16/00* (2019.01); *G06Q 10/10* (2013.01)

(58) Field of Classification Search
    CPC ......... G06F 17/30253; G06F 17/30265; G06F 17/30047; G06F 21/60; G06F 2221/074;
    (Continued)

(56) References Cited

U.S. PATENT DOCUMENTS 7,070,098 B1 *   7/2006   Lapstun ................... B41J 3/60
                                                      235/432
7,697,162 B2 *   4/2010   Yamamizu ......... H04N 1/00846
                                                      358/1.14
(Continued)

FOREIGN PATENT DOCUMENTS

CN          102222294 A      10/2011
CN          102882993 A       1/2013
(Continued)

OTHER PUBLICATIONS

Supplemental Search Report for European Application No. 158751354, dated May 14, 2018, 6 pages.
(Continued)

*Primary Examiner* — Aklilu K Woldemariam

(57) ABSTRACT

An information presentation method and apparatus. The method comprises: monitoring a designated operation for a DOI; and when it is detected that the designated operation is executed for the DOI, presenting profile information corresponding to the DOI. In the method, when a DOI is presented in an interface, a user only needs to perform a designated operation for the DOI, and profile information corresponding to the DOI is displayed on the interface; and the profile information corresponding to the DOI is generated based on all information contained in the DOI itself, and can accurately reflect the information in the DOI, so that the user can intuitively learn the information contained in the DOI without using other devices to scan and decode the DOI, thereby effectively improving the identification degree of the DOI and simplifying the operation process.

15 Claims, 2 Drawing Sheets

(58) Field of Classification Search
CPC .......... G06F 3/00; G06F 3/1454; G06F 21/10;
G06F 21/51; G06F 21/57; G06F 21/64;
G06F 17/30241; G06F 17/30867; G06F
16/338; G06F 3/0482; G06F 8/34; G06K
9/00456; G06K 9/325; G06K 7/10732;
G06K 7/146; G06K 9/00577; G06K
15/181; G06K 9/00268; G06K 9/348;
G06N 5/022; G06Q 10/00; G06Q 30/00;
G06Q 30/02; G06Q 30/0201; H04L
65/1059; H04L 67/18; H04L 67/325;
H04L 2463/101; H04L 63/10; H01S
5/005; H01S 5/4025; G02B 19/0085;
G02B 26/10; G08G 1/205; H04N
1/00326; H04N 1/00244; H04N 21/4725;
H04N 2201/3226; H04N 13/189; H04N
1/00968; H04N 21/454; H04N
2201/0082; H04N 9/8205; H04M
1/27455; H04M 3/42; G01C 21/32; G05D
1/0088; G05D 1/0248
USPC .......... 235/375, 454, 462, 494; 382/100, 190
See application file for complete search history.

(56) References Cited

U.S. PATENT DOCUMENTS

| | | | |
|---|---|---|---|
| 8,279,039 | B2 | 10/2012 | Thorn |
| 8,385,589 | B2* | 2/2013 | Erol .................... G06F 16/5846 382/100 |
| 9,027,837 | B2 | 5/2015 | Hwang |
| 9,311,734 | B1* | 4/2016 | Siddavanahalli ... G06F 16/5866 |
| 2001/0054090 | A1* | 12/2001 | Jung ........................ H04L 63/10 709/219 |
| 2003/0037010 | A1* | 2/2003 | Schmelzer .............. G06F 21/10 705/67 |
| 2003/0050932 | A1* | 3/2003 | Pace ........................ G06F 8/60 |
| 2005/0138179 | A1* | 6/2005 | Encarnacion ........... H04L 63/10 709/227 |
| 2005/0279832 | A1 | 12/2005 | Kobayashi et al. |
| 2007/0038950 | A1* | 2/2007 | Taniguchi ............... G01C 21/26 715/768 |
| 2007/0067333 | A1 | 3/2007 | Cho et al. |
| 2011/0078620 | A1 | 3/2011 | Chiou et al. |
| 2011/0143811 | A1* | 6/2011 | Rodriguez ......... G06K 9/00986 455/556.1 |
| 2011/0225048 | A1 | 9/2011 | Nair |
| 2012/0128241 | A1* | 5/2012 | Jung .................. G06K 9/00711 382/165 |
| 2013/0062402 | A1 | 3/2013 | Cok et al. |
| 2013/0073473 | A1* | 3/2013 | Heath .................... G06Q 30/02 705/319 |
| 2013/0246584 | A1 | 9/2013 | Barton et al. |
| 2013/0283195 | A1 | 10/2013 | Bilgen et al. |
| 2013/0290234 | A1* | 10/2013 | Harris .................... G06N 5/022 706/46 |
| 2013/0317966 | A1* | 11/2013 | Bass ...................... G06Q 30/02 705/37 |
| 2013/0341401 | A1 | 12/2013 | Kannan et al. |
| 2014/0021249 | A1 | 1/2014 | Hwang |
| 2014/0270536 | A1* | 9/2014 | Amtrup .............. G06K 9/00442 382/195 |
| 2015/0170164 | A1* | 6/2015 | Marsico ............. G06Q 30/0201 235/375 |
| 2015/0262031 | A1 | 9/2015 | Wang et al. |
| 2016/0203352 | A1* | 7/2016 | Marsico ................. G06Q 50/24 235/375 |
| 2016/0350953 | A1* | 12/2016 | Mittelstaedt ............ G06T 11/60 |

FOREIGN PATENT DOCUMENTS

| | | |
|---|---|---|
| CN | 103218595 A | 7/2013 |
| CN | 103366272 A | 10/2013 |
| CN | 103761062 A | 4/2014 |
| CN | 104102891 A | 10/2014 |
| JP | 2006-4037 A | 1/2006 |
| JP | 2014-110024 A | 6/2014 |
| WO | 2014/161425 A1 | 10/2014 |

OTHER PUBLICATIONS

International Search Report and Written Opinion for Application No. PCT/CN2015/098249, dated Jul. 7, 2016 (with English Translation), 9 pages.
Notice of Decision for Rejection dated Feb. 19, 2019, issued in related Korean Application No. 10-2017-7021075 (9 pages).
Chinese Second Office Action dated Jan. 9, 2019, issued in related Chinese Application No. 201410838339.9 (25 pages), with English machine translation.
First Office Action dated Aug. 23, 2018, issued in related Korean Application No. 10-2017-7021075 (11 pages).
Chinese First Search dated Jul. 23, 2018, issued in Chinese Application No. 201410838339.9 (2 pages).
Chinese First Office Action dated Aug. 1, 2018, issued in Chinese Application No. 201410838339.9 (22 pages).
Japanese First Office Action dated Jul. 31, 2018, issued in Japanese Application No. 2017-534968 (11 pages).
PCT International Preliminary Report on Patentability dated Jul. 13, 2017, issued in International Application No. PCT/CN2015/098249 (8 pages).
Office Action dated Mar. 19, 2019, issued in related Japanese Application No. 2017-534968 (5 pages).
Notice of Allowance dated May 4, 2019 issued in related Korean Application No. 10-2017-7021075.

* cited by examiner

INFORMATION PRESENTATION METHOD AND APPARATUS

CROSS-REFERENCE TO RELATED APPLICATIONS

This application is a continuation application of International Application No. PCT/CN2015/098249, filed on Dec. 22, 2015, which is based on and claims priority to and benefits of Chinese Patent Applications No. 201410838339.9, filed with the State Intellectual Property Office (SIPO) of the People's Republic of China on Dec. 29, 2014. The entire contents of the above-identified applications are incorporated herein by reference.

TECHNICAL FIELD

The present application relates to the field of computer technologies, and in particular, to an information presentation method and apparatus.

BACKGROUND ART

With development of the information technology, a Digital Object Unique Identifier (DOI) such as a bar code generated by a digital resource identification technology has been widely used. The DOI is a coded pattern formed by distribution of specific geometries (e.g., elongated shapes and squares) according to a certain rule, and includes: a one-dimensional barcode, a two-dimensional barcode (also referred to as a QR code), and the like.

The DOI, after coding various kinds of "intangible" information such as link information, product information, and text information, presents the information by means of graphics, and a user can use a corresponding device to scan and identify the DOI, thus acquiring information contained in the DOI. Due to coded graphic attributes of the DOI, distribution of geometries in the DOI is relatively complicated, and the corresponding device can scan the DOI and extract corresponding information therefrom only through a corresponding decoding algorithm, for the user, it is difficult to identify the DOI, especially when the user manages or selects various DOIs, it is hard for the user to intuitively judge and select a DOI to be used.

In the prior art, for the foregoing situation, some DOI providers may generally add simple text on a pattern of a DOI (e.g., at the bottom of the pattern of the DOI) generated to explain and illustrate the DOI, so that the user can determine the corresponding DOI through intuitive text.

However, the foregoing manner has some limitations, that is, in a manner of adding literal descriptions to the pattern of the DOI, due to the dimensional limit of the pattern of the DOI, the number of the literal descriptions added is limited, while the amount of information corresponding to the DOI is generally large, and a limited number of literal descriptions are difficult to indicate actual information contained in the DOI accurately and is also likely to mislead the user to some extent.

SUMMARY

Embodiments of the present application provide an information presentation method and apparatus, to solve the problem of relatively low identifiability in the current DOI presentation manner.

An information presentation method provided in the embodiments of the present application includes:

monitoring a designated operation for a DOI; and when it is detected that the designated operation is executed for the DOI, presenting profile information corresponding to the DOI.

An information presentation apparatus provided in the embodiments of the present application includes:

a monitoring module configured to monitor a designated operation for a DOI; and a presentation module configured to, when it is detected that the designated operation is executed for the DOI, present profile information corresponding to the DOI.

An information presentation device further provided in the embodiments of the present application includes:

a memory configured to store an information presentation program;

a display configured to perform display as instructed; and a processor configured to execute the information presentation program, when the information presentation program is executed by the processor, instruct the display to display a DOI in a first display region, and when a designated operation is performed for the DOI, instruct the display to display profile information related to the DOI in a second display region.

The embodiments of the present application provide an information presentation method and apparatus. In the exemplary method, when a DOI is presented in an interface, a user only needs to perform a designated operation for the DOI, and profile information corresponding to the DOI can be displayed on the interface. The profile information corresponding to the DOI is generated based on all information contained in the DOI itself, and can accurately reflect the information in the DOI, so that the user can intuitively learn the information contained in the DOI without using other devices to scan and decode the DOI, thereby effectively improving the identification degree of the DOI and simplifying the operation process.

BRIEF DESCRIPTION OF THE DRAWINGS

The accompanying drawings described herein are used to provide a further understanding for the present application, and constitute a part of the present application. Schematic embodiments of the present application and descriptions thereof are used to explain the present application, but do not constitute improper limitations to the present application. In the accompanying drawings.

DETAILED DESCRIPTION OF EMBODIMENTS

To make the objectives, technical solutions, and advantages of the present application clearer, the technical solutions of the present application are clearly and completely described below in combination with specific embodiments and corresponding drawings of the present application. It is apparent that the embodiments described are merely some, instead of all, of the embodiments of the present application. All other embodiments obtained by those of ordinary skill in the art based on the embodiments in the present application without creative efforts belong to the protection scope of the present application.

Figure 1:
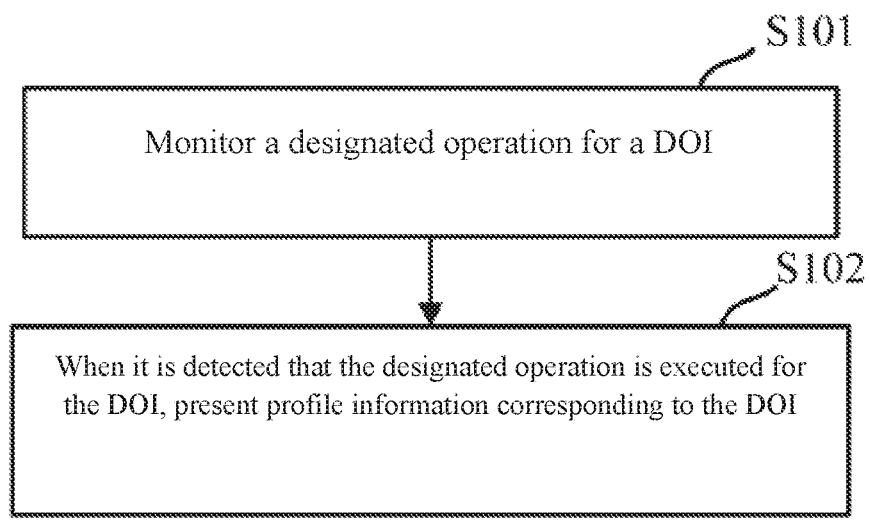
FIG. 1 is an information presentation process according to an embodiment of the present application.

FIG. 1 is an information presentation process according to an embodiment of the present application, and the process includes the following steps:

S101: An operation for a DOI is monitored.

In the embodiment of the present application, the DOI includes, but is not limited to, graphic logos such as bar codes and QR codes. The DOI may be displayed in a variety of interfaces such as a website page, an application page, and a hover window. An interface containing the DOI may be displayed by a variety of terminals having a display function such as computers, tablet computers, and smart phones.

In an actual application, when the DOI is displayed in the above interfaces, it is difficult for a user to intuitively identify information contained in the DOI, and the information in the DOI can be read only by using a device having a scanning function to scan the DOI. Therefore, to enable the user to intuitively identify the information contained in the DOI, in the embodiment of the present application, the user may perform a designated operation for the DOI, to display information related to the DOI.

When considering that the interface containing the DOI is displayed in different terminals, the user may adopt different operation manners. For example, when the interface containing the DOI is displayed in a display window of a mobile terminal having a touch-screen function, the user may usually adopt an operation manner of touch-screen click, such as press, touch, tap, etc.; when the interface is displayed in a display window of a computer terminal, the user may usually adopt an operation manner of mouse cursor click or hover. Then, in the embodiment of the present application, the designated operation may include: at least one of click and cursor hover. The cursor may specifically be a graphic structure for marking a control position such as various kinds of mouse pointers and cursors, which does not limit the present application.

It should be noted that the monitoring an operation for a DOI in the step S101 may be completed by a terminal displaying the DOI. Specifically, the operation may be monitored by various kinds of programs having a presentation function installed in the terminal (e.g., a browser, a player, and the like). There is no limitation on the monitoring programs in the present application.

S102: When it is detected that the designated operation is executed for the DOI, profile information corresponding to the DOI is presented.

Executing a designated operation for the DOI also means that the designated operation occurs in a presentation region of the DOI, hence, in the embodiment of the present application, the monitoring that the designated operation is executed for the DOI may specifically include: determining coordinate information of the DOI; and when it is detected that the designated operation is executed in a region corresponding to the coordinate information of the DOI, determining that the designated operation is executed for the DOI.

Figure 2:
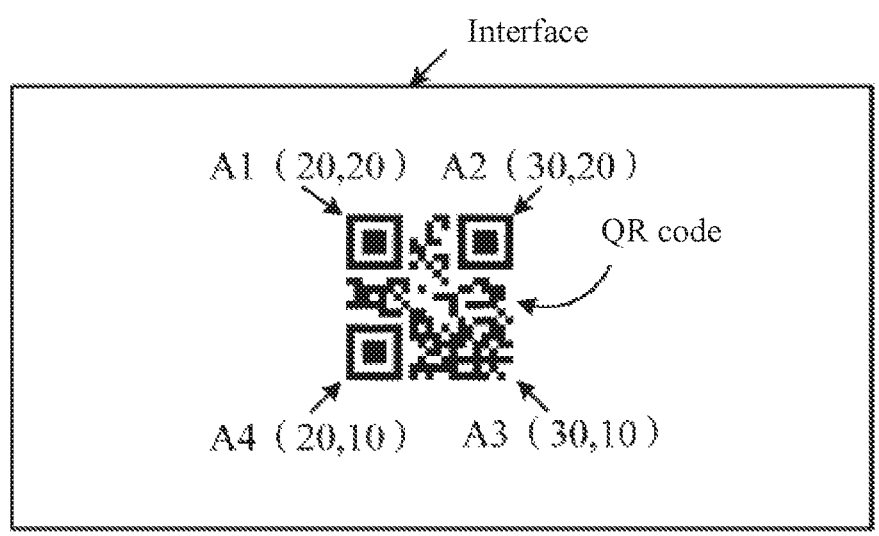
FIG. 2 is a schematic diagram of coordinate information of a QR code in an interface according to an embodiment of the present application.

For example, as shown in FIG. 2, the DOI is a QR code which is displayed in a corresponding interface, and coordinates of four vertices A1-A4 of the QR code have been determined in FIG. 2, so that a coordinate range corresponding to a region where the QR code is located can be further determined. That is, the horizontal coordinate of the region where the QR code is located is within a range of 20-30, and the vertical coordinate is within a range of 10-20; then, when the user's click operation or cursor hover is within the range, it may be considered that the designated operation executed for the DOI is detected.

Once it is determined that the designated operation is executed for the DOI, the profile information corresponding to the DOI would be presented. In this way, the user can intuitively learn the information contained in the DOI without using other devices to scan the DOI.

Here, it should be noted that, generally, the DOI may contain a variety of information, for example, a Uniform Resource Locator (URL) of a website page, a video clip, a picture, and so on. Then, the profile information of the DOI needs to reflect substantial content of the information contained in the DOI, that is, the profile information may be presentation-type information that reflects the information contained in the DOI by means of a profile, for example, a screenshot for a page corresponding to a URL, a thumbnail for a picture, and so on. In this way, the profile information can intuitively reflect a profile of the information contained in the DOI.

In some embodiment of the present application, the profile information may be displayed in a variety of manners such as a thumbnail, a hover window, and a dynamic page, which does not serve as a limitation to the present application.

Through the above steps, when a DOI is presented in an interface, a user only needs to perform a designated operation for the DOI, and profile information corresponding to the DOI is displayed on the interface; and the profile information corresponding to the DOI is generated based on all information contained in the DOI itself, and can accurately reflect the information in the DOI, so that the user can intuitively learn the information contained in the DOI without using other devices to scan and decode the DOI, thereby effectively improving the identification degree of the DOI and simplifying the operation process.

In the above steps, the profile information represents a profile of the information contained in the DOI, that is to say, generation of the profile information is based on the information contained in the DOI. Then, in the step S102, the presenting profile information corresponding to the DOI may specifically include: determining original information contained in the DOI, determining profile information of the DOI according to the original information, and presenting the profile information.

The original information is all information contained in the DOI that is prior to encoding, and in the embodiment of the present application, the original information may be at least one of a URL, an operation instruction, and multimedia information. For different original information, different manners may be adopted to determine the profile information of the DOI. The manner of determining the profile information of the DOI in the case of different original information is described in the following.

The First Manner:

In this embodiment, the original information is a URL. As the URL serves as a network address and is corresponding to a corresponding page, in this situation, the determining profile information of the DOI according to the original information may specifically include: generating an access request for the URL according to the URL contained in the DOI, acquiring a page corresponding to the URL based on the access request, taking a screenshot of the page, and determining the screenshot as the profile information corresponding to the DOI.

That is to say, when the original information of the DOI is a URL, if the designated operation for the DOI is detected in the interface, the screenshot of the page corresponding to the URL would be presented in the current interface. Thus, the information contained in the DOI is intuitively presented in the interface.

In some circumstances, the page corresponding to the URL may contain more content, all the content in the page cannot be clearly displayed by the screenshot of the page, and thus in the above manner, feature information in the page may also be extracted, and the feature information is determined as the profile information corresponding to the DOI.

For example, suppose that the original information of the DOI displayed in the interface is a URL and a page corresponding to the URL is a news page, then titles of respective pieces of news can be extracted from the news page as feature information of the page, and the feature information containing the titles of the respective pieces of news is determined as the profile information corresponding to the DOI and is presented in the corresponding interface. In the above example that, in the embodiment of the present application, the feature information includes text information in the page.

The Second Manner:

In this embodiment, the original information is an operation instruction. In this manner, if the user uses a corresponding device to scan the DOI, the device would directly perform a corresponding operation, for example, a connecting operation of connecting to a certain network, an operation of subscribing to a certain video or magazine, an operation of paying for a certain commodity, and so on. That is to say, in this manner, the operation instruction is not corresponding to a certain page and does not have intuitive graphic information, and then, the profile information of the DOI cannot be presented by means of a page screenshot; however, considering that the operation instruction generally includes operation information, the operation information can be presented as the profile information, that is, the determining profile information of the DOI according to the original information may specifically include: determining operation information corresponding to the operation instruction according to the operation instruction contained in the DOI, and determining the operation information as the profile information corresponding to the DOI.

The operation instruction may be at least one of a network connection instruction, a subscription instruction, and a payment instruction. Each operation instruction may correspond to different operation information as described in detail below.

In one embodiment, the operation instruction is a network connection instruction. In this case, if the user uses a corresponding device to scan the DOI, the corresponding device may be connected to a corresponding wireless network (e.g., WIFI). In an actual application, when a device is connected to a certain wireless network, it is often necessary to determine the name of the wireless network and an Internet Protocol (IP) address of a network device generating the wireless network, some wireless networks are further provided with corresponding check information (e.g., password information), and in order to connect the device to the wireless network, check information of the wireless network can be determined. In the embodiment of the present application, when the operation instruction is the network connection instruction, the operation information corresponding to the operation instruction may include: at least one of IP address information, check information, and network connection identifier information.

In another embodiment, the operation instruction is a subscription instruction. In this case, if the user uses a corresponding device to scan the DOI, subscription would be made to a corresponding service (e.g., a multimedia service such as magazine, video, and news). Considering that the subscription instruction may generally contain an identifier of the service, for example, the name of the magazine, the name of the video, and the like, and that data of the service corresponding to the subscription instruction is generally based on a data source of an Extensible Markup Language (XML), for example, a Really Simple Syndication (RSS) data source, therefore, in the embodiment of the present application, when the operation instruction is the subscription instruction, the operation information corresponding to the operation instruction includes: at least one of service identifier information and Extensible Markup Language (XML) information.

In a further embodiment, the operation instruction is a payment instruction. In this case, if the user uses a corresponding device to scan the DOI, a payment operation may be completed. The payment instruction may generally be corresponding to a corresponding payment amount and a user account for receiving money. Therefore, in the embodiment of the present application, when the operation instruction is the payment instruction, the operation information corresponding to the operation instruction includes: at least one of payment amount information and account information.

The Third Manner:

In this embodiment, the original information is multimedia information. In some circumstances of an actual application, the multimedia information is not suitable for being presented directly as the profile information of the DOI, for example, suppose that the multimedia information is picture information which is corresponding to a large-sized picture, if the picture is directly presented as the profile information, the size of the picture may go beyond the range of the interface that displays the DOI, that is, the picture cannot be completely displayed in the interface, and as a result, some information in the picture may be missing. Therefore, in the embodiment of the present application, the determining profile information of the DOI according to the original information may specifically include: determining designated information in the multimedia information according to the multimedia information contained in the DOI, and determining the designated information as the profile information corresponding to the DOI.

The multimedia information may include: at least one of text information, video information, audio information, and picture information. Each piece of multimedia information may be corresponding to different designated information as described below.

If the multimedia information is text information, in order to ensure that the user can learn profile information in the text information intuitively and correctly and a presentation range of the profile information does not go beyond the range of the interface that displays the DOI, a designated amount of text in the text information can be presented, that is, the designated information includes: a designated amount of text.

For example, suppose that designated information of text information of a current news type is a title not more than 15 words, multimedia information contained in a certain DOI is current news in the form of text, and the title of the current news is 8 words, then, the title of the current news can be determined as designated information of the current news, thus, after the user performs the designated operation for the DOI, the title can be displayed in the interface as the profile information of the DOI.

In an actual application, if the amount of text corresponding to the text information is relatively small, all the text information can be presented as the profile information of the DOI, and the amount of the text in the designated information can be dynamically adjusted according to requirements of the actual application, for example, the amount of the text in the designated information is adjusted according to the size of a display region in the interface, the amount of the text in the designated information is properly increased in the case that the display region of the interface is relatively large, and the amount of the text in the designated information is properly decreased in the case that the display region of the interface is relatively small.

If the multimedia information is video information, images corresponding to some frames in the video information can be presented, that is, when the multimedia information is the video information, the designated information includes: an image corresponding to a designated frame.

In some scenarios, the profile information may be presented by means of a hover play window, then, when the multimedia information is the video information, the profile information of the DOI may be played in the hover play window, and the played content may be frame data of a designated time period in the video information, and may also be all of the video information. Therefore, in the scenarios, the designated information includes: all of the video information or some of the video information.

If the multimedia information is audio information, an identifier corresponding to the audio information may be presented, for example, the audio information is a song, and the identifier of the song may be: the name of the song, the song-writer, the album to which the song belongs, and so on. Hence, when the multimedia information is the audio information, the designated information includes: audio identifier information.

In some other scenarios, the profile information may be presented by means of a hover play window, then, the designated information, in addition to including the audio identifier information, may be all of or some of the audio information, and is directly played in the hover play window.

If the multimedia information is picture information, considering that an actual size of a picture corresponding to the picture information may be greater than a display region of the interface that displays the DOI, the designated information may include a thumbnail of the picture corresponding to the picture information.

In an actual application, the size of the thumbnail may be adjusted according to the actual size of the picture corresponding to the picture information and the size of the display region of the interface that displays the DOI, and if the display region of the interface that displays the DOI is sufficient to display the whole picture, the picture corresponding to the picture information may be displayed completely.

The above are various manners of presenting the profile information corresponding to the DOI in the page, the above manners indicate examples of presenting the profile information in the present application, and in an actual application, other manners may also be adopted to present the profile information of the DOI. For example, a terminal displaying a DOI, after receiving a designated operation for the DOI, sends a code identifier corresponding to the DOI to a server, the server searches for original information corresponding to the DOI according to the code identifier of the DOI, and the server determines profile information of the DOI according to the original information of the DOI and feeds back the profile information to the terminal, so that the terminal can directly present the received profile information of the DOI. The process that the server determines profile information of the DOI according to the original information of the DOI is the same as the above manners, and is not repeated herein any more.

In addition, as a preferred manner of the embodiment of the present application, when the above manner is adopted to present the profile information corresponding to the DOI, a presentation region of the profile information would not block the display region of the DOI, which may not affect scanning on the DOI. Thus, the user not only can learn information in the corresponding DOI through the profile information but also can use a corresponding device to scan the DOI. Therefore, in the step S102, the presenting profile information corresponding to the DOI may specifically include: determining a preset region corresponding to the DOI, and presenting the profile information in the preset region, wherein the preset region is not overlapping with a region where the DOI is located.

Figure 3:
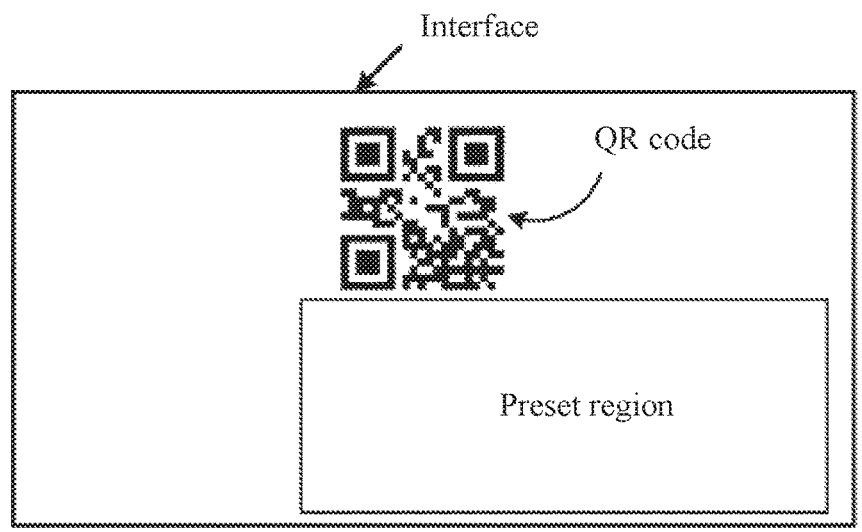
FIG. 3 is a schematic diagram of a QR code and a preset region corresponding thereto according to an embodiment of the present application.

For example, as shown in FIG. 3, in some embodiments, the DOI is a QR code, and after it is detected that a click operation is executed on the QR code in FIG. 3, the profile information of the DOI may be presented in a preset region of the DOI.

The above is the information presentation method according to the embodiment of the present application. Based on the same concept, an embodiment of the present application further provides an information presentation apparatus, as shown in FIG. 4.

Figure 4:
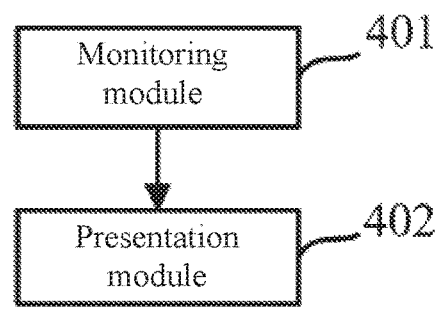
FIG. 4 is a schematic structural diagram of an information presentation apparatus according to an embodiment of the present application.

The information presentation apparatus in FIG. 4 includes: a monitoring module 401 and a presentation module 402. In some embodiments, the monitoring module 401 is configured to monitor a designated operation for a DOI. The DOI includes, but is not limited to, graphic logos such as bar codes and QR codes. The designated operation includes: at least one of click and cursor hover. In some embodiments, the presentation module 402 is configured to, when it is detected that the designated operation is executed for the DOI, present profile information corresponding to the DOI.

The monitoring module 401 may be specifically configured to determine coordinate information of the DOI, and when it is detected that the designated operation is executed in a region corresponding to the coordinate information of the DOI, determine that the designated operation is executed for the DOI.

The presentation module 402 may be specifically configured to determine original information contained in the DOI, determine profile information of the DOI according to the original information, and present the profile information.

In the manner that the original information is a URL, the presentation module 402 may be specifically configured to: generate an access request for the URL according to the URL contained in the DOI, acquire a page corresponding to the URL based on the access request, take a screenshot of the page, and determine the screenshot as the profile information corresponding to the DOI; or extract feature information in the page, and determine the feature information as the profile information corresponding to the DOI, wherein the feature information includes text information in the page.

In the manner that the original information is an operation instruction, the presentation module 402 may be specifically configured to: determine operation information corresponding to the operation instruction according to the operation instruction contained in the DOI, and determine the operation information as the profile information corresponding to the DOI. The operation information may include: at least one of a network connection instruction, a subscription instruction, and a payment instruction.

Specifically, when the operation instruction is the network connection instruction, the operation information includes: at least one of Internet Protocol IP address information, check information, and network connection identifier information. When the operation instruction is the subscription instruction, the operation information includes: at least one of service identifier information and Extensible Markup Language (XML) information. When the operation instruction is the payment instruction, the operation information may include: at least one of payment amount information and account information.

In the manner that the original information is multimedia information, the presentation module 402 may be specifically configured to: determine designated information in the multimedia information according to the multimedia information contained in the DOI, and determine the designated information as the profile information corresponding to the DOI. The multimedia information may include: at least one of text information, video information, audio information, and picture information. Specifically, when the multimedia information is the text information, the designated information may include: a designated amount of text. When the multimedia information is the video information, the designated information includes: an image corresponding to a designated frame. When the multimedia information is the audio information, the designated information includes: audio identifier information. When the multimedia information is the picture information, the designated information includes: a thumbnail of a picture.

For the above manners, the presentation module 402 may be specifically configured to: determine a preset region corresponding to the DOI, and present the profile information in the preset region; wherein the preset region is not overlapping with a region where the DOI is located.

Figure 5:
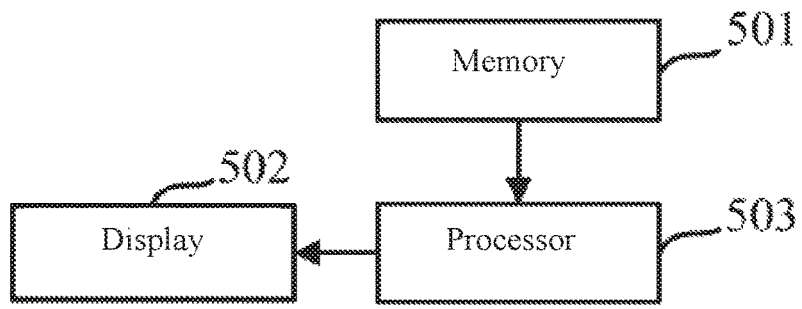
FIG. 5 is a schematic structural diagram of an information presentation device according to an embodiment of the present application.

As shown in FIG. 5, an embodiment of the present application further provides an information presentation device, including: a memory 501 configured to store an information presentation program, a display 502 configured to perform display as instructed, and a processor 503 configured to execute the information presentation program, when the information presentation program is executed by the processor, instruct the display to display a DOI in a first display region, and when a designated operation is performed for the DOI, instruct the display to display profile information related to the DOI in a second display region.

The first display region does not overlap with the second display region, that is, the first display region and the second display region are similar to the region of the DOI and the preset region in the method, and thus are not specifically repeated herein.

In some embodiments of the present application, the designated operation includes: at least one of click and cursor hover. In some embodiments of the present application, the information presentation program may be a browser or client software, and may also be other programs having an information presentation function, which is not specifically limited herein. In some embodiments of the present application, the DOI is a QR code.

In a typical configuration, a computing device includes one or more processors (CPU), an input/output interface, a network interface e, and a memory.

The memory may include a volatile memory, a random access memory (RAM) and/or a non-volatile memory or the like in a computer readable medium, for example, a read only memory (ROM) or a flash RAM. The memory is an example of the computer readable medium.

The computer readable medium includes non-volatile and volatile media as well as movable and non-movable media, and can implement information storage by means of any method or technology. Information may be a computer readable instruction, a data structure, a module of a program or other data. An example of a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer readable medium does not include transitory media, such as a modulated data signal and a carrier.

It should also be noted that, the terms "include" and "comprise" or any other variations intend to cover non-exclusive inclusion, so that processes, methods, goods or devices including a series of elements not only include the elements, but also include other elements not explicitly listed, or also include inherent elements of the processes, methods, goods or devices. In the absence of more limitations, the elements defined by the expression "including a/an . . . ," do not exclude that the processes, methods, goods or devices including the elements also have other identical elements.

Those skilled in the art should understand that the embodiments of the present application may be provided as methods, systems or computer program products. Therefore, the present application may adopt the form of complete hardware embodiments, complete software embodiments or embodiments of a combination of software and hardware. Moreover, the present application may adopt the form of a computer program product implemented on one or more computer useable storage media (including, but not limited to, a magnetic disk memory, a CD-ROM, an optical memory, and so on) containing computer useable program code.

The above descriptions are merely embodiments of the present application, and not intended to limit the present application. For those skilled in the art, the present application may have various modifications and changes. Any modification, equivalent replacement, improvement, and the like made without departing from the spirit and principle of the present application should all fall within the scope of the claims of the present application.

The invention claimed is:
1. An information presentation method, comprising:
displaying a digital object identifier ("DOI") in a user interface;
determining original information contained in the DOI;
determining profile information corresponding to the DOI according to the original information;

determining a range of horizontal coordinates and a range of vertical coordinates specifying a first region of the user interface in which the DOI is located;

receiving an input interacting with the user interface, wherein the input comprises a designated operation for the DOI within the range of horizontal coordinates and the range of vertical coordinates; and when it is detected that the designated operation is executed for the DOI, presenting the profile information corresponding to the DOI in a second region of the user interface, wherein the second region is outside the range of horizontal coordinates and the range of vertical coordinates.

2. The method according to claim 1, wherein the original information is a URL; and the determining profile information of the DOI according to the original information comprises:

generating an access request for the URL according to the URL contained in the DOI;

acquiring a page corresponding to the URL based on the access request; and taking a screenshot of the page, and determining the screenshot as the profile information corresponding to the DOI; or extracting feature information in the page, and determining the feature information as the profile information corresponding to the DOI, wherein the feature information comprises text information in the page.

3. The method according to claim 1, wherein the original information is an operation instruction; and the determining profile information of the DOI according to the original information comprises:

determining operation information corresponding to the operation instruction according to the operation instruction contained in the DOI; and determining the operation information as the profile information corresponding to the DOI;

wherein the operation instruction comprises at least one of: a network connection instruction, a subscription instruction, and a payment instruction;

when the operation instruction is the network connection instruction, the operation information comprises at least one of: Internet Protocol (IP) address information, check information, and network connection identifier information;

when the operation instruction is the subscription instruction, the operation information comprises at least one of: service identifier information and Extensible Markup Language (XML) information; and when the operation instruction is the payment instruction, the operation information comprises at least one of: payment amount information and account information.

4. The method according to claim 1, wherein the original information is multimedia information; and the determining profile information of the DOI according to the original information comprises:

determining designated information in the multimedia information according to the multimedia information contained in the DOI; and determining the designated information as the profile information corresponding to the DOI;

wherein the multimedia information comprises at least one of: text information, video information, audio information, and picture information;

when the multimedia information is the text information, the designated information comprises: a designated amount of text;

when the multimedia information is the video information, the designated information comprises: an image corresponding to a designated frame;

when the multimedia information is the audio information, the designated information comprises: audio identifier information; and when the multimedia information is the picture information, the designated information comprises: a thumbnail of a picture.

5. The method according to claim 1, wherein the designated operation comprises: at least one of click and cursor hover.

6. A system comprising a processor and a non-transitory computer-readable storage medium storing instructions executable by the processor to cause the system to perform operations comprising:

displaying a digital object identifier ("DOI") in a user interface;

determining original information contained in the DOI;

determining profile information corresponding to the DOI according to the original information;

determining a range of horizontal coordinates and a range of vertical coordinates specifying a first region of the user interface in which the DOI is located;

receiving an input interacting with the user interface, wherein the input comprises a designated operation for the DOI within the range of horizontal coordinates and the range of vertical coordinates; and when it is detected that the designated operation is executed for the DOI, presenting the profile information corresponding to the DOI in a second region of the user interface, wherein the second region is outside the range of horizontal coordinates and the range of vertical coordinates.

7. The system of claim 6, wherein the original information is a URL; and the determining profile information of the DOI according to the original information comprises:

generating an access request for the URL according to the URL contained in the DOI;

acquiring a page corresponding to the URL based on the access request;

taking a screenshot of the page, and determine the screenshot as the profile information corresponding to the DOI; or extract feature information in the page, and determine the feature information as the profile information corresponding to the DOI, wherein the feature information comprises text information in the page.

8. The system of claim 6, wherein the original information is an operation instruction; and the determining profile information of the DOI according to the original information comprises:

determining operation information corresponding to the operation instruction according to the operation instruction contained in the DOI; and determining the operation information as the profile information corresponding to the DOI;

wherein the operation instruction comprises at least one of: a network connection instruction, a subscription instruction, and a payment instruction;

when the operation instruction is the network connection instruction, the operation information comprises at least one of: Internet Protocol (IP) address information, check information, and network connection identifier information;

when the operation instruction is the subscription instruction, the operation information comprises at least one of: service identifier information and Extensible Markup Language (XML) information; and when the operation instruction is the payment instruction, the operation information comprises at least one of: payment amount information and account information.

9. The system of claim 6, wherein the original information is multimedia information; and the determining profile information of the DOI according to the original information comprises:

determining designated information in the multimedia information according to the multimedia information contained in the DOI; and determining the designated information as the profile information corresponding to the DOI;

wherein the multimedia information comprises at least one of: text information, video information, audio information, and picture information;

when the multimedia information is the text information, the designated information comprises: a designated amount of text;

when the multimedia information is the video information, the designated information comprises: an image corresponding to a designated frame;

when the multimedia information is the audio information, the designated information comprises: audio identifier information; and when the multimedia information is the picture information, the designated information comprises: a thumbnail of a picture.

10. The system of claim 6, wherein the designated operation comprises: at least one of click and cursor hover.

11. A non-transitory computer-readable storage medium configured with instructions executable by one or more processors to cause the one or more processors to perform operations comprising:

displaying a digital object identifier ("DOI") in a user interface;

determining original information contained in the DOI;

determining profile information corresponding to the DOI according to the original information;

determining a range of horizontal coordinates and a range of vertical coordinates specifying a first region of the user interface in which the DOI is located;

receiving an input interacting with the user interface, wherein the input comprises a designated operation for the DOI within the range of horizontal coordinates and the range of vertical coordinates; and when it is detected that the designated operation is executed for the DOI, presenting the profile information corresponding to the DOI in a second region of the user interface, wherein the second region is outside the range of horizontal coordinates and the range of vertical coordinates.

12. The non-transitory computer-readable storage medium of claim 11, wherein the designated operation comprises at least one of: click and cursor hover.

13. The non-transitory computer-readable storage medium of claim 11, wherein the DOI includes a QR code.

14. The method of claim 1, wherein the DOI includes a QR code.

15. The system of claim 6, wherein the DOI includes a QR code.

* * * * *